(No Model.) 3 Sheets—Sheet 2.
F. GENDRON.
GALVANIC BATTERY.
No. 467,372. Patented Jan. 19, 1892.
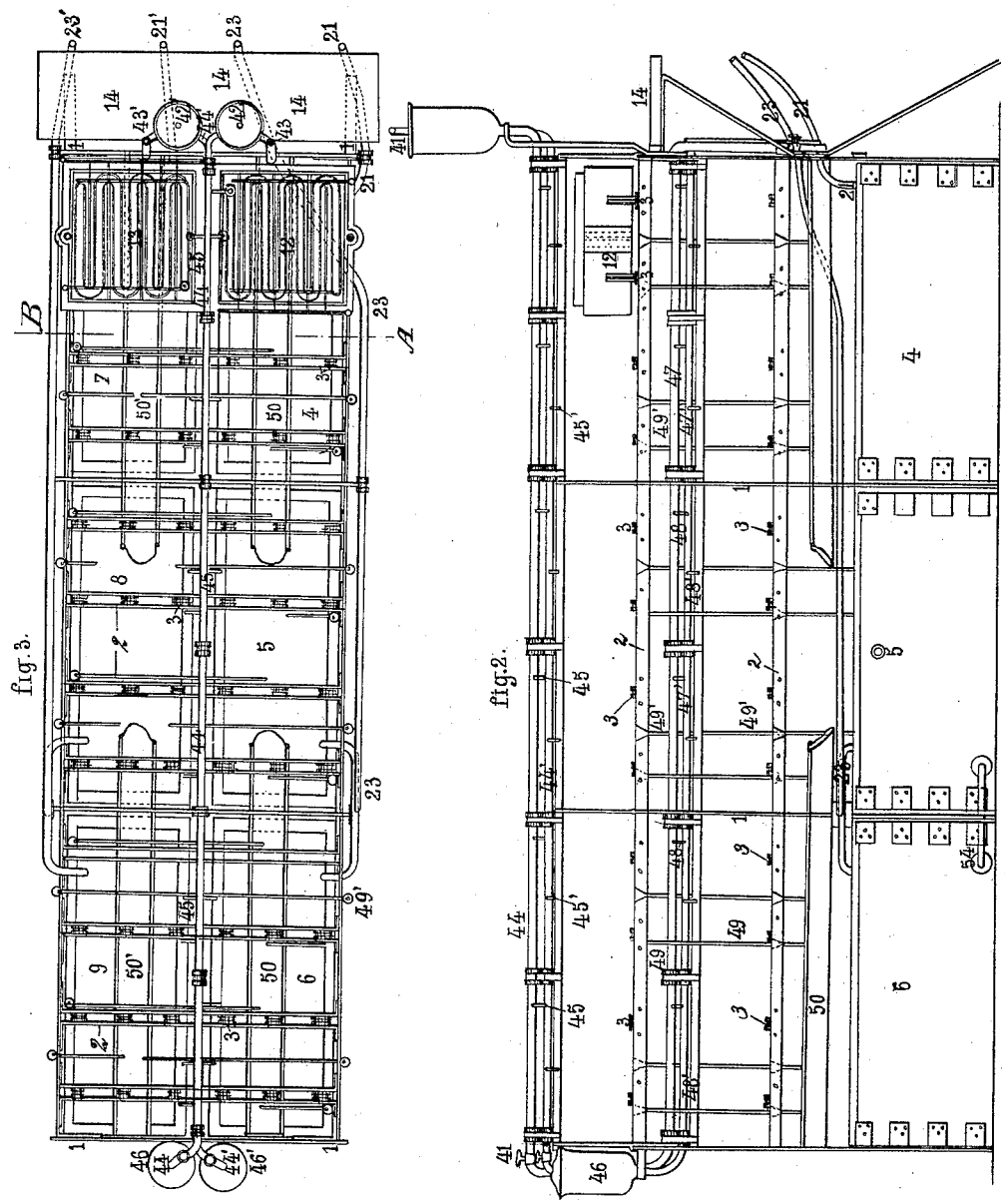
Witnesses:
Lo. Sedgwick
E. M. Clark
Inventor:
F. Gendron
by Munn & Co.
Attorneys.

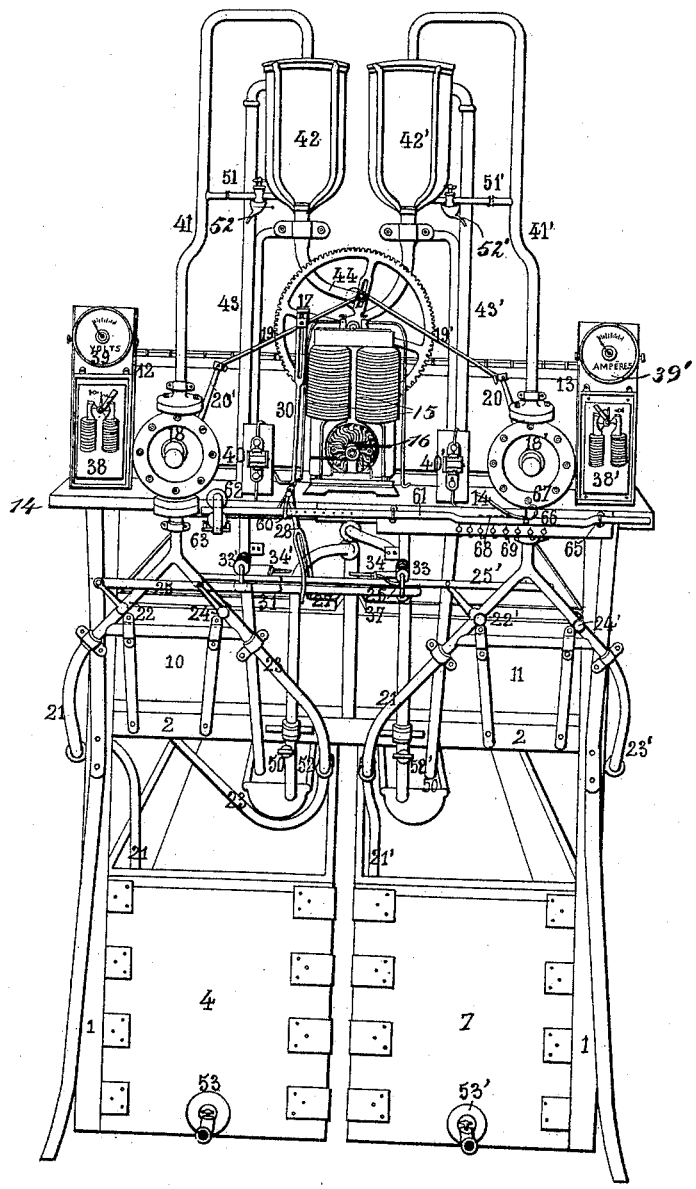

(No Model.) 3 Sheets—Sheet 3.
F. GENDRON.
GALVANIC BATTERY.
No. 467,372. Patented Jan. 19, 1892.
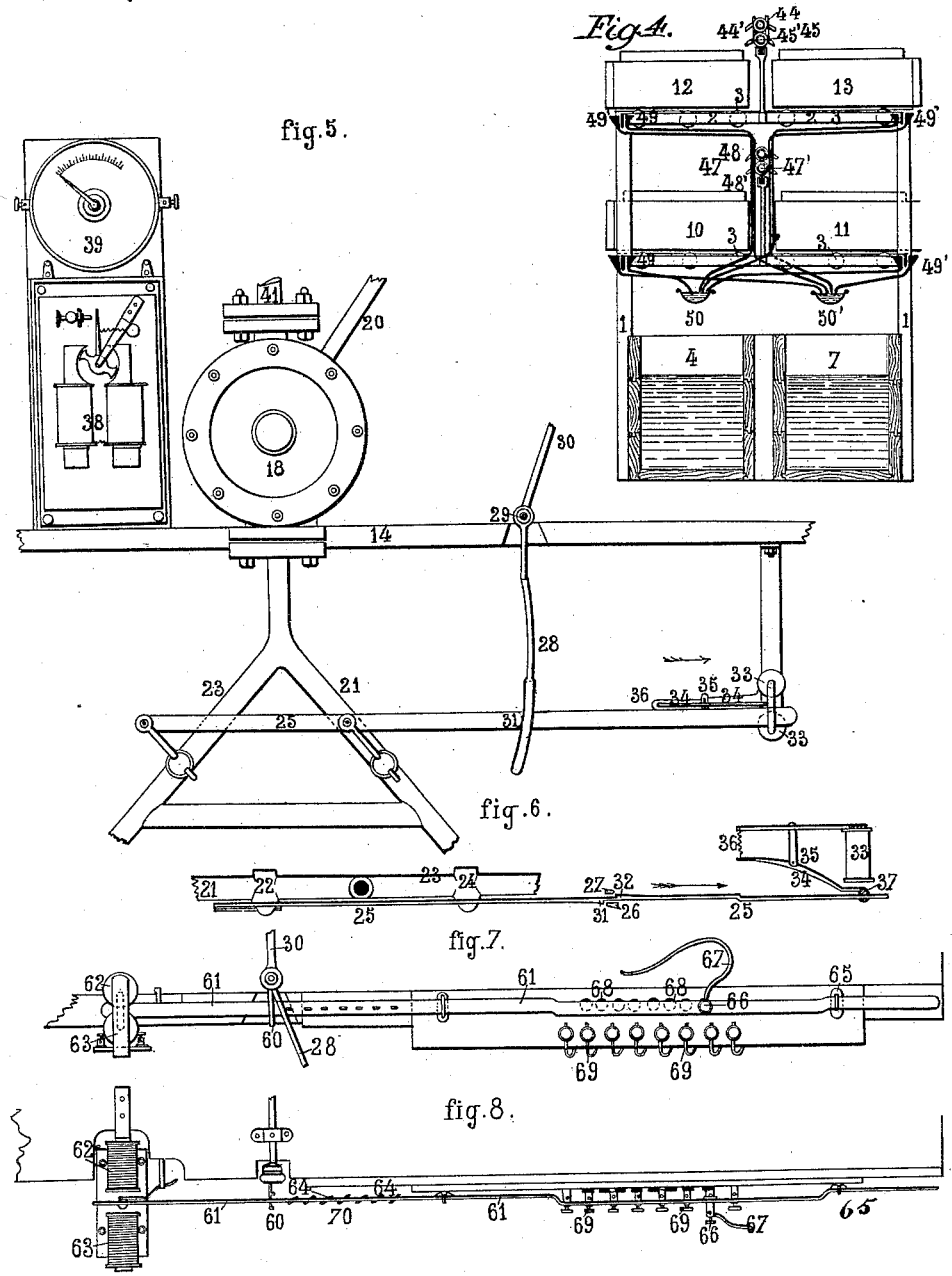
Witnesses:
C. Sedgwick
E. M. Clark.
Inventor:
F. Gendron
by Munn & Co
Attorneys

UNITED STATES PATENT OFFICE.

FERNAND GENDRON, OF BORDEAUX, FRANCE.

GALVANIC BATTERY.

SPECIFICATION forming part of Letters Patent No. 467,372, dated January 19, 1892.

Application filed May 14, 1891. Serial No. 392,699. (No model.)

*To all whom it may concern:*

Be it known that I, FERNAND GENDRON, a citizen of France, residing at Bordeaux, Department of the Gironde, France, have invented a new and useful Improvement in Galvanic Batteries, of which the following is a specification.

My invention consists of an improved primary battery, and is formed by the combinations hereinafter described, by which the output of the battery is regulated automatically according to the work demanded of the battery, whatever this work may be, from the smallest amount of work—such, for example, as the supply of a lamp of ten-candle power—to the greatest amount of work that a battery can do.

The automatic operation of my battery is as follows: I will suppose here, to facilitate explanations, that my battery is for the supply of electric-lighting purposes and that it can supply at one time fifteen lamps of ten-candle power. Let us suppose that five lamps are lighted first, for example, the electro-magnetic arrangements described hereinafter bringing into play the numbers of elements necessary to actuate the five lamps. The part which operates first, therefore, is a regulator of the number of elements in operation. The lamps continue their service, while two pumps, also actuated by electricity, cause the circulation of the liquids in the battery. When in consequence of the operation the liquids have become too weak, so that the first series of elements is insufficient for the service of the five lamps, the regulator of the number of elements operates and a new element is added to those which operated at first, the elements which were not used at first being added gradually and according to the weakness of the liquids to the elements which were sufficient for the five lamps in the beginning. It will be the same if several lamps are added to the five lamps used at first. When during the circulation of the liquids in use the regulator of which we have just spoken has brought into operation for one or the other of these two reasons, or for both reasons, all the elements, the liquids continuing to grow weak, the circulating-pumps revive the liquid. A continuous operation of the battery is thus assured by automatic means.

I will now describe, with all the instructions and details necessary for the execution, the arrangements the combination of which gives my improved system of battery.

The annexed drawings represent my improvements applied to a battery composed of elements of cells with two liquids.

I call attention to the fact that the nature of the elements of cells composing my battery has no bearing on the present invention, provided that the exciting-liquid (acidulated water) and the depolarizing-liquid (solution of bichromate of soda or potash) be separated from one another in the cells. I will limit myself, therefore, to the special points in the installation of my battery and in the arrangement of the parts which assure the regularity of its service.

Figure 1 is an end perspective view of the end of the battery where the regulating apparatus is placed. Fig. 2 is a longitudinal elevation of the same. Fig. 3 is a plan view. Fig. 4 is a transverse section on the line A B of Fig. 3. Fig. 5 shows in elevation, on an enlarged scale, the regulator of the electromotive force. Fig. 6 is a partial plan view of the same. Figs. 7 and 8 show in elevation and in plan the regulator of the number of elements in service.

For the sake of simplifying the drawings the motor and its accessories are not represented in Figs. 2 and 3. The various cells of the battery are arranged in rows in a sort of closet, with three or more tiers formed of vertical posts 1 1 1 and transverse horizontal supports 2 2 2, provided with insulating-blocks 3 3 3, on which the receptacles of the cells can roll to facilitate their removal. On the lowest floor of the closet are placed six wooden trays or tanks 4 5 6 7 8 9, Figs. 1, 2, and 3. Two of these tanks are shown in section in Fig. 4. The tank 4 contains fresh acidulated water. The tanks 5 and 6 contain acidulated water which has already circulated in the cells, and the tank 7 a fresh solution of bichromate of potash. The tanks 8 and 9 contain the solution of bichromate of potash which has already circulated in the batteries. The two upper tiers support the cells, provision being made, as shown in the drawings, for twenty-four cells. Fig. 4 shows this arrangement by tiers very clearly. There are shown four of the elements 10 11 12 13, carried by the blocks 3. Such is the general arrangement of the battery.

I will now describe the arrangement for the regulation of the current, referring to Fig. 1. The upper tier is prolonged by a shelf 14, on which is fixed a little dynamo-electric motor 15, which operates, being constantly fed by the current of two or three of the elements of the battery. I prefer to take for the operation of the motor the electric elements which are nearest to the motor. The main shaft 16 of the electric motor causes the rotation of a toothed wheel 17 of large diameter by means of a chain or other equivalent means of transmission. This wheel 17 will thus turn slower than the shaft of the electric motor, and its speed may be slightly increased, so as to be able to command the pumps 18 and 18' by means of the cranks 19 and 19', joined to the extremities of the levers 20 and 20'. These pumps can be of any construction which have been specially arranged for the elevation of acid liquids, and constructed, as well as their tubing, of a material which is not attacked by the liquids. These two pumps, which I do not claim in any way, operate under the action of an oscillating lever 20 or 20', and they are controlled at the same time and in the same manner, the only difference being that the pump 18 serves exclusively for the circulation and renewing of the acidulated water, while the pump 18' serves exclusively for the circulation and renewing of the solution of bichromate of soda or potash. It will be sufficient, therefore, to explain the operation of pump 18 and the manner in which it is controlled by the regulator, the same numerals of reference indicating the parts which have the same functions in the two pumps and their piping, these numbers being provided with the exponent 1 when they designate the parts of the pump 18'. The suction-pipe of the pump 18 is bifurcated, and one of its branches 21 plunges into the fresh acidulated water. It can be opened or closed by the cock 22. The other branch 23 is plunged into the tanks 5 and 6, containing acidulated water which passes off from the elements of the battery. It can be opened by the cock 24. The levers which control the cocks 22 and 24 are always connected by the rod 25, so that one cannot be open without having the other closed. The rod 25 is prolonged so as to pass between the two branches 26 and 27 of fork 28, which receives an oscillating movement around the shaft 29 of the crank 19 by means of the slotted lever 30. In this place the rod 25 carries two little projections 31 and 32, arranged in an inverse order, as shown in Fig. 6, so as to meet one or the other of the two branches 26 and 27 of the oscillating fork 28, according to whether the rod 25 bends slightly toward one or the other. Opposite the end of this rod 25 is an electro-magnet with two bobbins 33, Fig. 6, which, when the current passes through it, attracts the lever 34, which is movable around the axis 35, against the resistance of the spring 36. The extremity of the lever 34 is provided with a recessed cross-bar 37, embracing the rod 25, at the same time permitting it a vertical displacement in the recess. These details of construction are seen on an enlarged scale in Figs. 5 and 6. The electro-magnet 33 is connected by a conducting-wire (not shown in the drawings) with a relay 38, placed below the voltmeter 39, and through the bobbins of which the current passes. This relay is so arranged as to send the current to the electro-magnet 33, as will be explained hereinafter.

Finally, 40 and 40' are the commutators, one of which permits of interrupting the current which passes to the motor, so as to stop the latter when desired, and the other is for breaking the exterior circuit.

The regulator of the number of elements in use is controlled by an arrangement somewhat similar to that of the pumps. A second fork 60 is arranged below the crank 30 near to the fork 28, Figs. 1, 7, and 8. This fork 60 embraces a plate 61, which is held by its elasticity in the position of equilibrium, Fig. 8, between the two opposite electro-magnets 62 and 63. These two magnets are derived (shunted) from the batteries, which actuate the motor, and the current which passes through them is interrupted or closed by the play of the relay 38'. When the supply-current becomes too feeble, one of these magnets 62, for example, becomes active and the plate 61 is moved from its position of equilibrium. The fork 60 in its interrupted oscillating movement can then abut against one of the teeth 64, arranged on the side of the plate 61, and the latter is drawn toward the left. The fork 60, which is guided in 65 to its other end, carries to the right a conducting spring-key 66, connected with a flexible conductor 67. The wire 67 terminates at one end of the battery, and the fixed metallic keys 68 are connected by the screws 69 with one of the poles of the successive elements of the battery. The lateral displacement of the plate 61 carries the key 66 successively over the keys 68, and thus causes a variation of the number of elements in use. When equilibrium is re-established between the exterior resistance and the supply from the battery by the addition of one or more elements, the electro-magnet 62 ceases to receive any current, the plate 61 again assumes its position of equilibrium, and the fork 60 acts no longer on the teeth of the plate 61. Finally it happens that, either in consequence of the gradual exhaustion of the liquids or by the lighting of new lamps in the circuit, all the available elements in the circuit have been introduced. Not until then can the fork 28 modify the action of the pumps by stopping the circulation and supplying fresh liquids. It is understood that the action of the regulator of the number of elements which we have just described is reversible. When it is the magnet 63 which receives the current, the plate 61 is pushed in the other direction by the action of the fork 60 on the teeth 70. The number of elements in use is diminished until there is an equilibrium again between the exterior resistance and the supply from the battery. In case all the available elements in the circuit have been introduced, the battery continuing to operate, the liquids become weak, the relay 38' maintains the contact, closing the current derived from the magnet, which has added to the circuit successively all the elements, and the same current passes by the magnet 33, which changes the position of the cocks 22 and 24. At each change of the key of the regulator of the number, the current has been directed to the electro-magnet 33, but for too short a time to cause a movement of the cocks 22 and 24 it is only by the permanent inclination of the relay 38' that the rod 25 can be actuated by the fork 28. These parts acts together as follows: Let us suppose the battery in its normal condition, the voltmeter 39 and the ampére-meter 39' proving it. The cocks 22 and 24 22' and 24', and also the rods 25 and 25', then occupy the positions represented by Fig. 1—that is to say, the cocks 22 and 22' are closed while the cocks 24 and 24' are open. Consequently the pumps operate, one on the acidulated water, which has already been weakened in the tanks 5 and 6, and the other on the solution of bichromate already weakened in the tanks 8 and 9. These liquids are driven back by the said pumps through the tubes 41 and 41' into the funnels 42 and 42', provided with overflow-tubes 43 and 43'. The liquids thus poured into the funnels flow off partly by the tubes 44 and 44' and the spouts 45 45 45' 45' in the cells of the battery which contain them. Half of the liquids sent back by the pumps thus flows into the elements on the upper shelf. The remainder of the liquid, after having passed through the entire length of the tubes 44 and 44', falls into the funnels 46 and 46', and passes in the same manner by the tubes 47 and 47' and the spouts 48 48 48' 48' in the cells of the batteries in the middle shelf. As fast as the liquids sent back by the pumps thus arrive at the upper parts of the cells they take the place of the most exhausted liquids, which flow off by the little funnel-tubes 49 49 and 49' 49' into the channels 50 and 50', which direct them to their respective tanks, where they are ultimately taken up again by the pumps to recommence the above-described course. This continuous circulation will last as long as the electro-motive force does not fall below a certain limit corresponding to the work of all the elements of the battery on the resistance of a certain number of lamps. For example, let us suppose that the liquids gradually become weak, all the elements will enter successively into circuit, and the service continuing the pumps will feed fresh liquid. In this case the relays 38 and 38' will begin to act to send the current into the electro-magnets 33 and 33'. This is, for example, what will result from the circulation of the acidulated water. The electro-magnet 33 will attract and hold against its soft-metal cores the recessed cross-bar at the end of the lever 34, and consequently the rod 25. This rod being turned aside by the part 27 of the oscillating fork, this part 27 will abut against the projection 32 of the rod 25, which it will draw in the direction of the arrow, Figs. 5 and 6, thus closing the cock 24 and opening the cock 22. For the moment the pump 18, instead of drawing in the exhausted acidulated water by the tube 23, will draw up fresh acidulated water by the tube 21 in the tank 4, which it will direct to the elements of the battery, thus replacing the exhausted acidulated water that the batteries contained. The acid liquid will thus be revivified and the electro-motive force will increase and will soon again attain its normal value. From that time the relay 38 will again take its normal position of equilibrium, interrupting the current in the electro-magnet 33. The latter will cease to attract the rod 35, which will be pushed back by the spring 36, and returned to its original position, represented in Fig. 1 by the part 26 of the oscillating fork, which will have met in its path the projection 31 of the rod 25. From this moment the cock 22 will be closed, the cock 24 opened, and the pump 18 will commence again to cause to circulate in the cell the revivified liquid which is found there and will cease to send in fresh liquid. The pump 18' for the bichromate is controlled in the same way by the electro-magnet 33' receiving the current from the relay 38' and operating in the same manner. The sensitiveness of the relay 38' compared with that of the relay 38 can also be calculated so as to cause the operation of the pump 18' only after the relay 38 has caused the pump 18 to begin to operate—that is, if, in spite of the renewal of the acidulated water produced by the regulating action of the pump 18, the electro-motive force of the battery continues to diminish the pump 18' will interpose in its turn to renew the solution of bichromate until the normal supply is re-established.

The system includes several accessory parts which it will be useful to mention.

The tubes 41 and 41' of the pumps 18 and 18' are connected with the funnels 42 and 42' by the tubes 51 and 51', with cocks permitting the suction of the pump before its operation is begun.

The tubes are provided with cocks 52 and 52', by which they can be emptied when the apparatus is not in use. The tanks also have in their lower parts clearing-cocks, such as 53 and 53'. The tanks for the exhausted liquid 5, 6, 8, and 9 are provided with overflow-tubes, which carry off the most exhausted liquids, that are less dense than the fresh liquids. The tanks 5, 6, 8, and 9, which contain, respectively, the liquids of the same nature, are connected at their lower parts by connections—such as 54—so that the level of the liquid will be the same in both tanks.

In all of this description I have supposed that the batteries have two liquids, separated from one another; but it will be understood that the same arrangement can be applied to batteries composed of two liquids or of two liquids mixed. In that case I will employ only one pump and one regulator, operating as already described.

It will be seen that my battery is formed in three tiers comprising six tanks for liquids and twenty-four elements; but it is evident that I will not depart from the spirit of my invention if I apply the same arrangement to a larger number or to a smaller number of these tanks and elements, or if I group them differently. Therefore I do not limit myself to the forms, dimensions, proportions, and materials mentioned only as examples in this description; and

I claim as my exclusive property—

1. An electric battery comprising a series of cells containing exciting and depolarizing liquids, in combination with an electric motor actuated by a portion of the battery elements, pumps driven by the motor and adapted to produce a circulation through the cells, and an automatic regulator of the number of cells in use, substantially as described.

2. An electric battery comprising a series of cells containing exciting and depolarizing liquids, in combination with an electric motor actuated by a portion of the battery elements, pumps driven by the motor and arranged to produce a circulation of liquids through the cells, a sliding rod carrying contact-keys to regulate the number of elements in use, and magnets arranged in a shunt-circuit and adapted to move the rod into position to be moved by the motor, substantially as described.

3. An electric battery comprising a series of cells containing exciting and depolarizing liquids, in combination with a series of tanks containing fresh liquids, an electric motor actuated by a portion of the battery elements, pumps operated by the motor and arranged to circulate the liquids in the cells and supply fresh liquids, and an automatic regulator for controlling the number of cells in use, substantially as shown and described.

4. An electric battery comprising a plurality of cells containing exciting and depolarizing liquids, tanks containing fresh liquids, cock-controlled pipes connecting the cells and connecting the cells with the tanks, a motor connected with a portion of the battery elements, pumps operated by the motor and adapted to supply liquid to the pipes, rods connected with the pipe-cocks and provided with projections, and relay-controlled magnets adapted to swing the rods into position to have the shoulders struck by levers operated by the motor, substantially as described.

In witness whereof I have signed this specification in the presence of two subscribing witnesses.

FERNAND GENDRON.

Witnesses:
ROBT. M. HOOPER,
W. JORY.